United States Patent [19]

Helbling

[11] 3,872,781

[45] Mar. 25, 1975

[54] INFUSION APPARATUS

[76] Inventor: Edward Helbling, 726 E. 10th St., Brooklyn, N.Y. 11230

[22] Filed: Apr. 1, 1974

[21] Appl. No.: 457,127

[52] U.S. Cl.............. 99/282, 99/283, 99/291, 99/302 R
[51] Int. Cl. ............................................ A47j 31/34
[58] Field of Search ............ 99/281, 282, 283, 291, 99/295, 298, 302 R, 300, 307, 316

[56] References Cited
UNITED STATES PATENTS

| | | | |
|---|---|---|---|
| 2,660,947 | 12/1953 | Forschner | 99/282 |
| 2,830,528 | 4/1958 | Arnett | 99/283 |
| 2,890,643 | 6/1959 | King | 99/283 |
| 3,087,415 | 4/1963 | Kaplan | 99/281 |
| 3,126,812 | 3/1964 | Nau | 99/291 |

Primary Examiner—Robert W. Jenkins
Attorney, Agent, or Firm—Karl F. Ross; Herbert Dubno

[57] ABSTRACT

An automatic coffee brewer has a fresh-water reservoir from which hot water is cyclically distributed to a set of coffee urns emptying into a common tank. Both the reservoir and the tank are provided with thermostat-controlled heaters and with level-controlling float switches. With the distributor inactive, an inlet pump fills the reservoir to its proper level whereupon the water supply is discontinued; upon heating of the stored water to the boiling point, a transfer pump goes into action simultaneously with the distributor. The transfer pump and the distributor are halted whenever the liquid in the tank reaches a predetermined volume, allowing the inlet pump to refill the reservoir.

10 Claims, 3 Drawing Figures

INFUSION APPARATUS

FIELD OF THE INVENTION

My present invention relates to automatic infusion apparatus, such as an electric coffee brewer, in which a hot beverage is produced by allowing boiling water to permeate a mass of coffee grounds or other particulate ingredient serving as a flavoring agent.

BACKGROUND OF THE INVENTION

In conventional automatic infusion devices of this type, consistency of quality of the beverage is not always assured. Thus, cold water fed into a water heater may not invariably be sufficiently hot before being infused through the coffee grounds, especially in times of heavy consumption.

OBJECTS OF THE INVENTION

It is therefore an object of my invention to provide an improved apparatus for automatically brewing and dispensing a hot beverage at varying rates as required, for example, in restaurants and similar commercial establishments.

It is also an object of my invention to assure consistently high quality of the brewed beverage by providing the apparatus with an operating program allowing for a variety of contingencies.

More specifically, it is an object of my invention to provide means for preventing insufficiently heated water from being infused into the brewing stage of such a system.

SUMMARY OF THE INVENTION

These objects are realized, in accordance with my present invention, by the combination of a fresh-water reservoir, provided with water-supply means such as an inlet pump, with a plurality of brewing vessels or urns adapted to store a particulate beverage ingredient referred to hereinafter as coffee grounds. The urns communicate with the fresh-water reservoir by a first set of conduits and with a tank for the brewed beverage (referred to hereinafter as coffee) by a second set of conduits. A predetermined initial water volume is established in the reservoir by first level-control means, such as a float switch, the reservoir being provided with first thermoelectrically controlled heating means designed to maintain the water therein substantially at the boiling point. A distributor cyclically connects the same via the first set of conduits to the several urns in a predetermined order of succession in an unoperated state of the inlet pump supplying fresh water to the reservoir while a transfer pump successively delivers boiling water from the reservoir to the several urns. The tank is provided with thermoelectrically controlled second heating means to maintain the infusion received from the urns, i.e., the coffee, at an elevated temperature, preferably around 95° C; the transfer pump and the associated distributor are arrested by second level-control means such as a float switch in the tank as soon as the coffee infusion reaches a predetermined maximum level. The tank has a manually operable outlet for drawing variable amounts of coffee therefrom.

With this arrangement, the fresh-water supply in the reservoir is replenished only when no liquid is tranferred from that reservoir to the brewing vessels so that no water substantially below boiling temperature can reach the coffee grounds in the urns. When coffee is drawn from the tank at a low rate, the distributor will stop after a fraction of a cycle so that the hot water corculates through the grounds of only one or two urns (in case the apparatus contains four or more urns) before the maximum level in the tank is restored and the water supply in the reservoir can be replenished. With a higher average rate of consumption, the distributor may go through or even beyond a full cycle at certain times so that it is desirable that the storage capacity of the reservoir substantially exceed the liquid volume of the tank (as bounded by the aforementioned maximum level) and that in turn the combined capacity of the several urns be somewhat greater than the tank volume so defined.

The replenishing of the reservoir upon the filling of the tank to its maximum level may be controlled manually or, preferably, automatically by an actuating circuit coupled to the level-control means of both the reservoir and the tank.

If the coffee is consumed so fast that the tank is drained at a rate higher than that of its refilling from the reservoir, the supply of boiling fresh water will ultimately be exhausted. In such a case the operation of the transfer pump may be halted in response to an alarm signal from the reservoir, either manually or automatically. Thus, for example, the dropping of the water supply below a critical lower level in the reservoir may be sensed by a thermostat normally serving to detect the boiling temperature of the water; the thermostat then stops the further outflow from the reservoir and restarts the inlet pump so that cold water enters the reservoir and restores the initial water volume therein whereupon normal operations can resume as soon as this water has reached the boiling point.

BRIEF DESCRIPTION OF THE DRAWINGS

The above and other features of my invention will now be described in detail with reference to the accompanying drawing in which.

SPECIFIC DESCRIPTION

Figure 1:
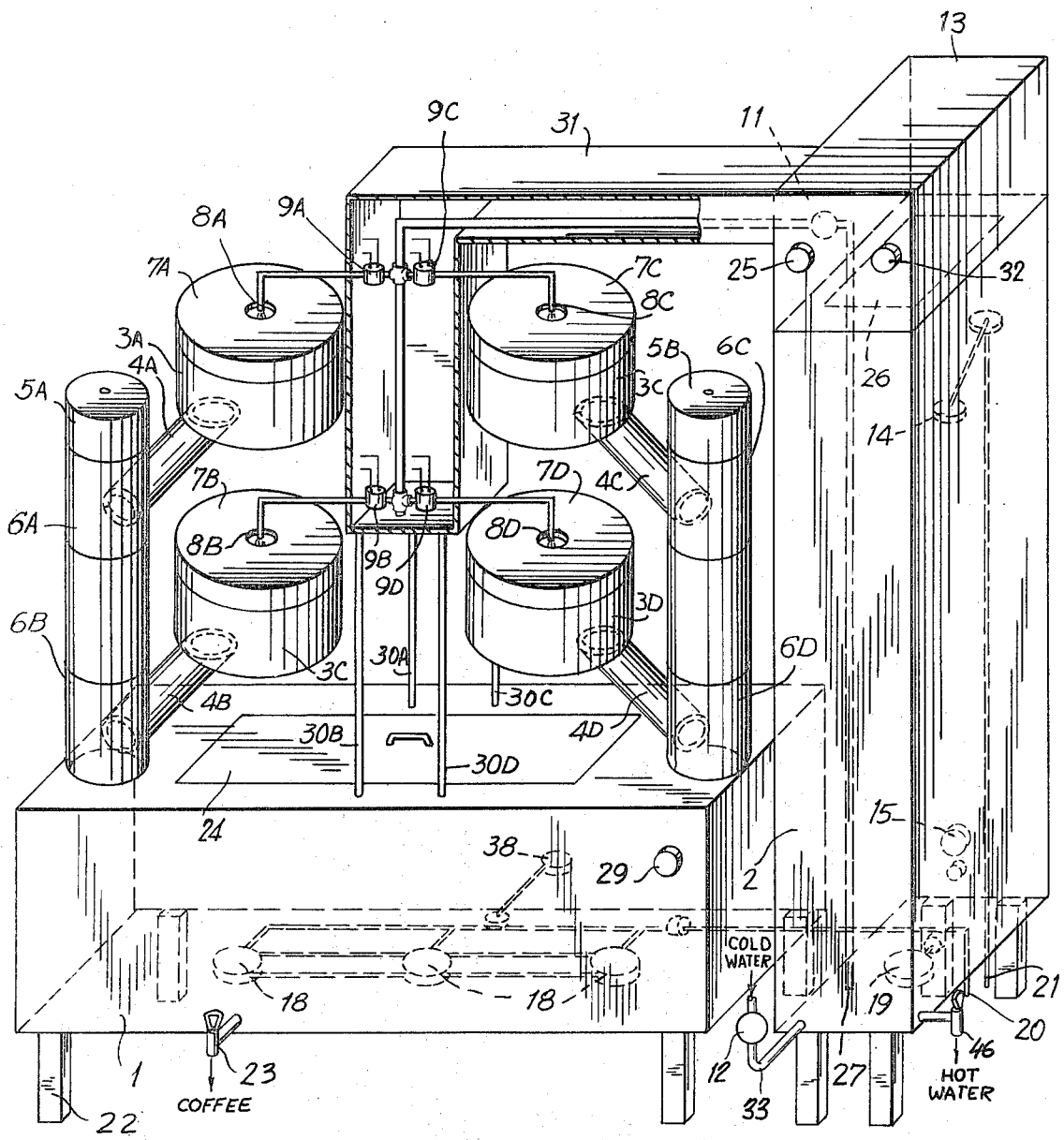
FIG. 1 is a perspective view, partly in section, of an embodiment of the present invention.

In FIG. 1 I have shown an apparatus for brewing coffee in accordance with my present invention. The apparatus comprises a horizontal tank 1 for an infusion delivered thereto from a set of brewing vessels or urns 3A - 3D containing coffee grounds to be permeated by boiling water from an upright reservoir 2 whose capacity exceeds the combined volume of the urns which in turn is larger than the effective volume of tank 1. Tank 1 and reservoir 2 form part of a structure, supported on legs 22, which also includes a control cabinet 13 detachably seated atop the reservoir and an extension 31 thereof supported by rods 30A - 30D on the top of tank 1. Removable lids 24 and 26 give access to the interior of tank 1 and reservoir 2, respectively.

The vessels 3A -3D communicate with the reservoir 2 through a riser pipe 27 and branch lines 8A -8D passing through openings in individual covers 7A - 7D thereof, these branches including respective valves 9A - 9D controlled by an electric distributor 40 (FIG. 2) as more fully described hereinafter. A transfer pump 11 in conduit 27 (e.g., of the positively acting gear type) is intermittently operable to deliver hot water from reservoir 2 to the several urns 3A - 3D in a predetermined order of succession. The urns have outlets 4A - 4D entering headers 6A - 6D which open from above into the tank 1. The covers 7A - 7D can be lifted and slid back along branch lines 8A - 8D to give access to the interior of vessels or urns 3A - 3D which may contain circular screens, not shown, supporting the coffee grounds stored therein; the screens and their loads can be lifted out of the open vessels and, after cleaning and reloading with fresh coffee, returned to the vessels before the covers are closed again.

Figure 2:
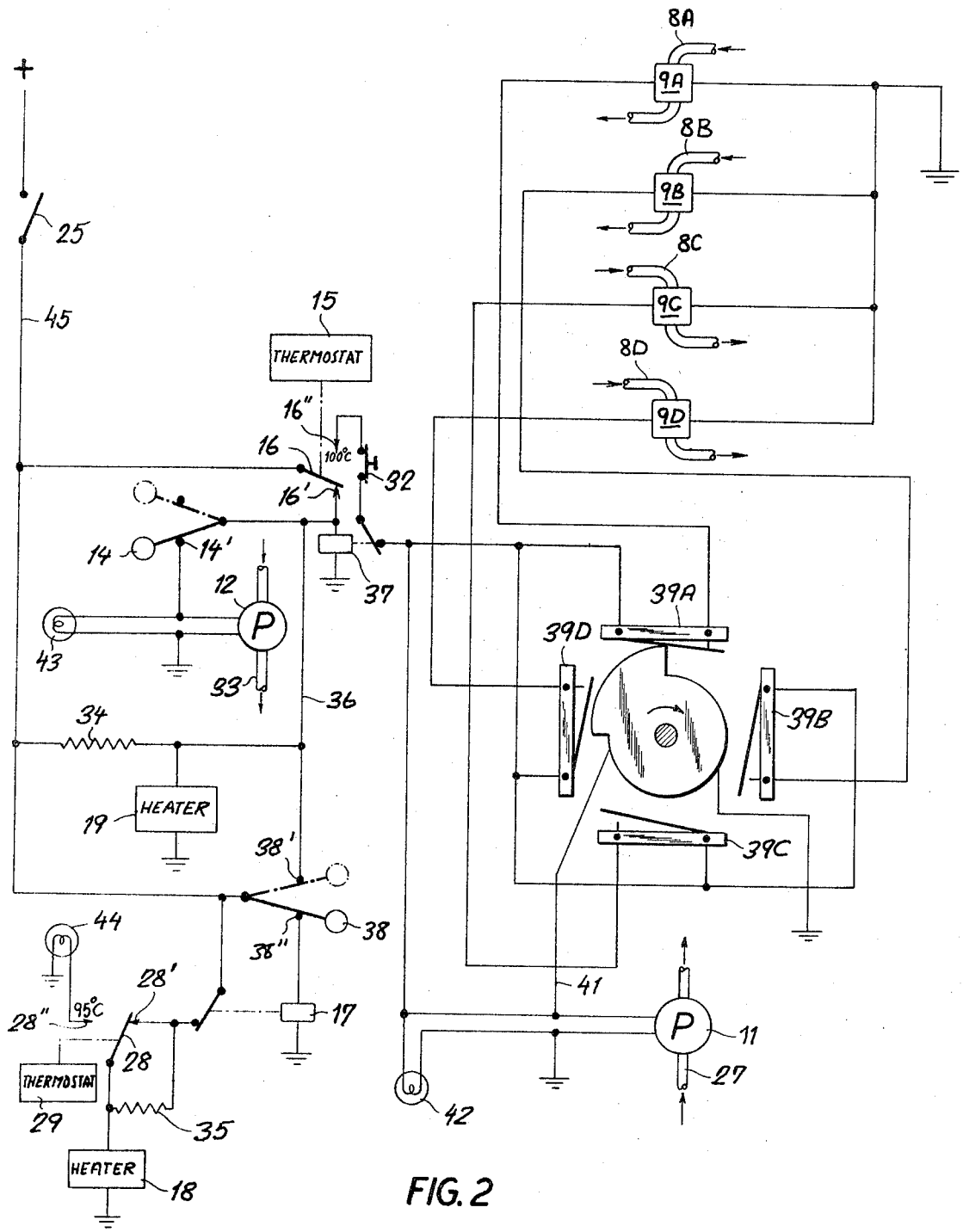
FIG. 2 is a circuit diagram for the apparatus shown in FIG. 1.

Tank 1 is internally provided with a float switch 38, also shown in FIG. 2 and more fully described in conjunction therewith, which determines whether the liquid in that tank has reached either of two predetermined levels. A set of electric heating elements 18 are controlled by a thermostat 29 to maintain a liquid temperature of approximately 95°C in the tank. A similar electric heater 19 near the bottom of reservoir 2 is controlled by a thermostat 15 to keep the contents of that reservoir at or near 100°C. A float switch 14 detects the maximum water level in the reservoir which is supplied by an inlet pump 12 in a conduit 33.

Hot coffee can be manually drawn from the tank 1 through a tap 23. A similar tap 46 near the bottom of reservoir 2 allows the withdrawal of boiling water therefrom for making other beverages, e.g., tea or soup.

FIG. 1 further shows a master switch 25 and a circuit breaker 32 mounted on control cabinet 13. Various monitoring lamps, shown in FIG. 2 but not in FIG. 1, may also be carried by that cabinet.

FIG. 2 illustrates the distributor 40 as a motor-driven rotary cam coacting with four normally open switches 39A - 39D whose closure, under conditions specified below, respectively opens the valves 9A - 9D normally blocking the branch conduits 8A - 8D. The energizing circuit 41 of the distributor motor extends from a supply terminal (+) through the master switch 25, a bus bar 45, an armature 16 of thermostat 15 and a make contact 16' thereof, the circuit breaker 32, and an armature and back contact of a relay 37 through the motor winding to ground. The drive motor of transfer pump 11 is connected in parallel with distributor motor 40, as is a monitoring lamp 42. The winding of relay 37 lies between a break contact 16' of thermostat armature 16 and ground, this break contact also forming part of an energizing circuit for the drive motor of inlet pump 12 which includes an armature of float switch 14 and an associated low-level contact 14'; another monitoring lamp 43 is connected in parallel with pump 12. A branch lead 36 extends from break contact 16' through heater 19 to ground, this heater being also energizable at a reduced rate through a resistor 34 directly from bus bar 45 in the closed state of master switch 25. Bus bar 45 is tied to an armature of float switch 38 which in its low-level position, via a contact 38', energizes a relay 17 whose armature and back contact extend the bus bar 45 through an armature 28 of thermostat 29 and an associated break contact 28' to the heater 18. In the operative condition of thermostat 29, i.e., at a temperature of at least 95°C in tank 1, heater 18 is maintained energized at a reduced rate through a resistor 35 from bus bar 45 via the armature and back contact of relay 17. A monitoring lamp 44 is connected to make a contact 28'' of switch 28 and energized by the current flowing through resistor 35 so as to light whenever the heater 18 operates in the sustaining mode, i.e., as long as the brewed coffee is at the proper temperature and fills the tank 1 above its minimum level as determined by the disengagement of contact 38' from the armature of float switch 38. This float switch has also a high-level contact 38'' whose engagement by the switch armature closes the operating circuit for relay 37 via lead 36, thereby de-energizing the distributor 40 and the transfer pump 11 while concurrently energizing the inlet pump 12 through float switch 14 in its full-line position indicating that the reservoir 2 has been partly emptied.

A manual opening of circuit breaker 32 enables the operator to block the circulation of hot water from reservoir 2 to the vessels 3A - 3D for the purpose of facilitating the reloading of some or all of these vessels as described above.

Figure 3:
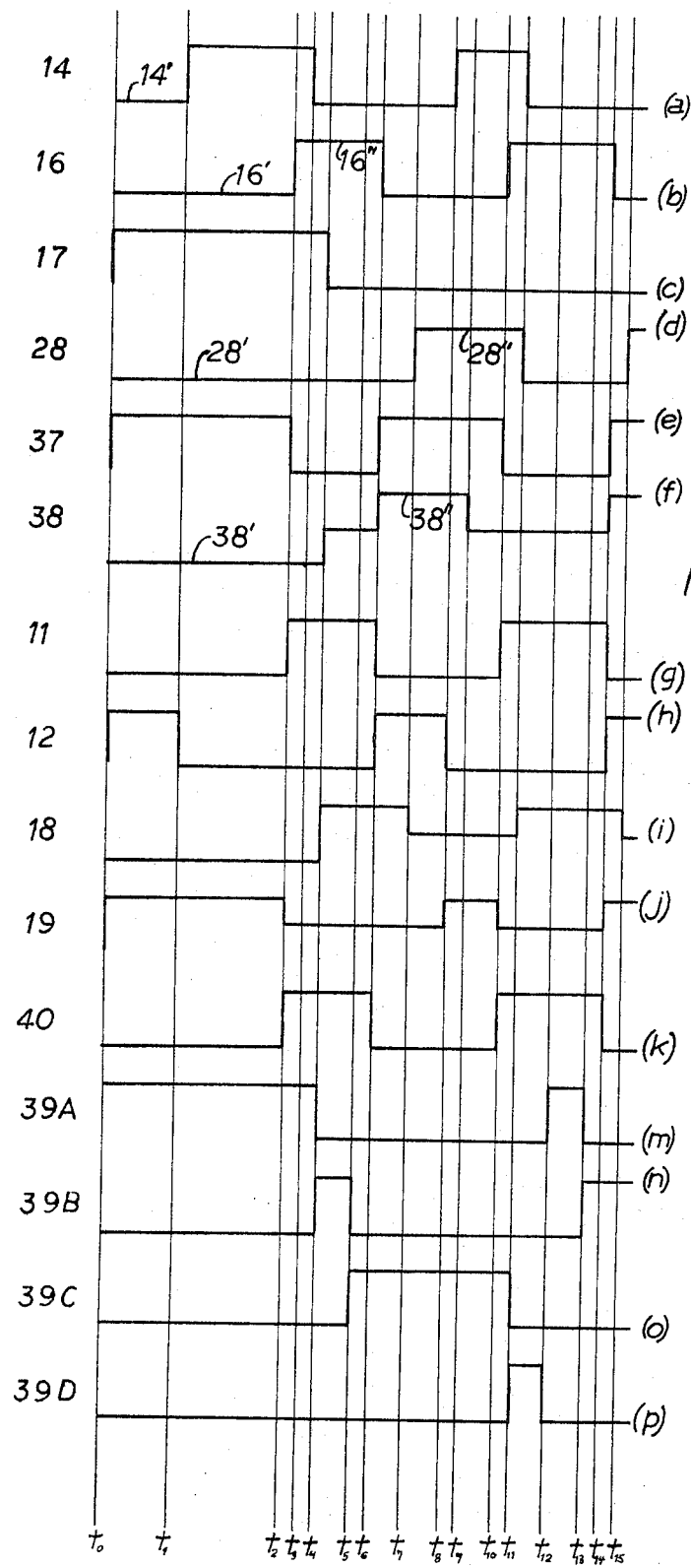
FIG. 3 is a set of graphs illustrating the operation of the apparatus.

Reference will now be made to FIG. 3 for the description of the operation of the apparatus shown in FIGS. 1 and 2, starting with closure of master switch 25 at a time $t_0$; it is assumed that containers 1 and 2 are emptied at this stage, float switches 14 and 38 being in their lower positions 14', 38' as indicated in graphs (a) and (f). Owing to the absence of hot liquid in these containers, thermostat switches 16 and 28 are in positions 16'' and 28', graphs (b) and (d). Relays 17 and 37, graphs (c) and (e), operate instantly so that the energizing circuit 41 for distributor 40 and transfer pump 11 is opened, graphs (k) and (g), and no current is supplied to heater 18, graph (i). Pump 12, however, operates as indicated in graph (h), and so does heater 19 as shown in graph (j). Water is thus immediately supplied to reservoir 2 and heated as it enters via pipe 33.

At time $t_1$ the water has reached a level which trips the float switch 14 and deactivates the pump 12 so that the influx is stopped. At time $t_2$ this initial volume of water has been brought to a boil so that thermostat 15 responds, reversing its switch armature 16 and releasing the relay 37 whereupon distributor 40 and pump 11 are set in motion as indicated to the operator by a lighting of monitoring lamp 42. With the starting position of the distributor cam as shown in FIG. 2, switch 39A is closed and remains so during the first quarter of a revolution as depicted in graph (m), thereby admitting hot water to urn 3A by way of valve 9A. After filtering through the coffee grounds contained therein, the resulting infusion enters the tank 1 and causes a drop in the water level of reservoir 2 so that float switch 14 returns to normal at time $t_3$; in view of the off-normal position 16'' of thermostat switch 16, however, this reversal does not reoperate the pump 12. Toward the end of the first quarter cycle, at time $t_4$, float switch 38 in tank 1 is raised to an intermediate level by the incoming liquid and releases the relay 17 to energize the heater 18, graph (i). As soon as the liquid in tank 1 reaches its desired temperature of 95°C, thermostat switch 28 reverses so that only a small sustaining current continues to flow through resistor 35 and heater 18. Monitoring lamp 44 lights to indicate that hot coffee is now available in tank 1 and can be drawn through outlet 23.

The distributor 40 and the pump 11 continue to operate until the liquid in tank 1 rises to its maximum level, i.e., until the float switch 38 assusmes its position 38'' to reoperate the relay 37, thereby stopping both the pump and the distributor. In the present example it is assumed that this occurs at a time $t_6$, after successive closures of switches 39B and 39C at times $t_4$ and $t_5$, graphs $(n)$ and $(o)$, whereby the hot water from reservoir 2 is sequentially channeled into urns 3A, 3B and 3C. At the instant $t_6$ of pump stoppage the distributor 40 has rotated through about 2½ quadrants; this position may be indicated to the operator by additional monitoring lamps or other signaling devices not shown. If desired, the operator may now open the circuit breaker 32 as a safety measure while removing the spent grounds from urn 3A and introducing fresh coffee into same; however, the original load of vessel 3A may still be good for one or more rounds.

Let us assume that thermostat switch 28 remains in its normal position 28' until a time $t_7$ when the target temperature of 95°C is reached. The current through heater 18 then drops to its sustaining level.

Pump 12, reactivated at time $t_6$ with the deactivation of pump 11, stops at time $t_8$ as the float switch 14 indicates the replenishment of the original contents of reservoir 2.

At time $t_9$ the drawing of additional coffee from tank 1 has brought down the liquid level therein to a point at which float switch 38 opens one of the two branches of the operating circuit of relays 37 which, however, is maintained energized at this time by the thermostat switch 16 in position 16' inasmuch as the freshly supplied water has not yet been heated to the boiling point. When this occurs, i.e., at time $t_{10}$, switch 16 again reverses to restart the distributor 40, graph $(k)$. The distributor cam thereupon completes the phase of closure of switch 39C, graph $(o)$, at time $t_{11}$ and subsequently, at time $t_{12}$, closes the switch 39D, graph $(p)$, thereupon returning to switch 39A, graph $(m)$, in the interval $t_{12} - t_{13}$ and eventually, at time $t_{14}$, stopping in a position of closure of switch 39B, graph $(n)$, as the relay 37 is reoperated by the float switch 38 in position 38''. Heater 18, it is assumed, is energized through thermostat switch 28 in position 28' during an interval $t_{11} - t_{15}$.

If, owing to excessive draining of tank 1, the liquid in reservoir 2 falls below the level of the thermostat 15 which is elevated above the reservoir bottom, switch 16 instantly reoperates the relay 37 and stops the flow of hot water to the vessels 3A - 3D while also restarting the inlet pump 12. The cold water then again rises to its maximum level controlled by float switch 14 whereupon normal operations resume as described above.

It will thus be seen that I have disclosed a system in which infusions of coffee or other beverages can be kept hot and in readiness for instant consumption for indefinite periods, with intervention of a human operator required only for drawing the liquid and for occasionally replacing the spent ingredients in the brewing vessels. Such a system is particularly useful in restaurants, canteens and similar locations of mass consumption; naturally, the number of brewing vessels or urns activated in rotation may be varied according to requirements and available space.

I claim:
1. An infusion apparatus comprising:
a fresh-water reservoir provided with water-supply means;
a plurality of brewing vessels adapted to store a particulate beverage ingredient;
first conduit means leading from said reservoir to said vessels;
first heating means in said reservoir;
first thermoelectric control means in said reservoir for operating said first heating means to maintain the water therein substantially at the boiling point;
first level-control means in said reservoir coupled with said water-supply means for establishing an initial water volume therein exceeding the combined volume of said vessels;
distributor means for cyclically connecting said reservoir via said first conduit means to said vessels in a predetermined order of succession;
transfer means in said first conduit means operative in an unoperated state of said water-supply means for cyclically delivering boiling water from said reservoir to said vessels via said distributor means;
a tank for beverage brewed in said vessels;
second conduit means connecting said vessels with said tank for delivering thereto an infusion produced by interaction of said boiling water with said particulate beverage ingredients;
second heating means in said tank;
second thermoelectric control means in said tank for operating said second heating means to maintain the infusion therein at an elevated temperature;
second level-control means in said tank coupled with said transfer means for arresting same upon said infusion reaching a predetermined maximum level; and
manually operable outlet means on said tank for drawing varying amounts of infusion therefrom.

2. An apparatus as defined in claim 1 said water-supply means is provided with an actuating circuit coupled to said first and second level-control means for reoperation upon said reservoir being filled with infusion to said predetermined maximum level.

3. An apparatus as defined in claim 2 wherein the storage capacity of said reservoir substantially exceeds the liquid volume in said tank bounded by said predetermined maximum level.

4. An apparatus as defined in claim 1 wherein said distributor means comprises valve means giving individual access to said vessels and timing means maintaining each of said vessels accessible for a period sufficient to fill same substantially to capacity, the combined capacity of said vessels exceeding said liquid volume in said tank.

5. An apparatus as defined in claim 4 wherein said timing means comprises a rotary cam and a set of contacts successively closable by said cam.

6. An apparatus as defined in claim 5 wherein said cam is provided with drive means connected to said transfer means for concurrent energization in the inoperative state of said water-supply means prior to said infusion reaching said predetermined level.

7. An apparatus as defined in claim 6 wherein the number of said vessels is four, said contacts being distributed about said cam for successive closure in respective quadrants of a cam revolution.

8. An apparatus as defined in claim 1, further comprising alarm means in said reservoir for blocking the operation of said transfer means upon the liquid in said reservoir dropping below a predetermined minimum level.

9. An apparatus as defined in claim 8 wherein said alarm means comprises a thermostat forming part of said first thermoelectric control means.

10. An apparatus as defined in claim 1, further comprising manually operable tap means on said reservoir for drawing boiling water therefrom.

* * * * *